(12) United States Patent
Horii

(10) Patent No.: US 12,155,797 B2
(45) Date of Patent: Nov. 26, 2024

(54) DEADLINE MANAGEMENT SYSTEM, CONTROL METHOD FOR DEADLINE MANAGEMENT SYSTEM, AND INFORMATION PROCESSING APPARATUS

(71) Applicant: SEIKO EPSON CORPORATION, Tokyo (JP)

(72) Inventor: Tetsuya Horii, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/469,632

(22) Filed: Sep. 19, 2023

(65) Prior Publication Data

US 2024/0098192 A1     Mar. 21, 2024

(30) Foreign Application Priority Data

Sep. 20, 2022   (JP) ................. 2022-149121

(51) Int. Cl.
*H04N 1/00*     (2006.01)
*G09B 7/02*     (2006.01)
*H04N 1/32*     (2006.01)

(52) U.S. Cl.
CPC ........... *H04N 1/00344* (2013.01); *G09B 7/02* (2013.01); *H04N 1/00209* (2013.01);
(Continued)

(58) Field of Classification Search
CPC ........ G01R 19/02; G01R 25/04; G01R 27/02; G01R 27/2605; H04N 1/32101; H04N 1/32144; H04N 1/32203; H04N 1/32208; H04N 2201/0094; H04N 2201/3242; H04N 2201/3269; H04N 2201/3271;
(Continued)

(56) References Cited

U.S. PATENT DOCUMENTS

| | | | | |
|---|---|---|---|---|
| 5,892,900 | A * | 4/1999 | Ginter | H04L 63/20 726/26 |
| 8,265,049 | B2 * | 9/2012 | Solver | H04L 61/2503 370/338 |

(Continued)

FOREIGN PATENT DOCUMENTS

JP         2004-333525 A     11/2004

*Primary Examiner* — Negussie Worku
(74) *Attorney, Agent, or Firm* — WORKMAN NYDEGGER

(57) ABSTRACT

A server apparatus includes an accepting unit configured to accept, from a personal computer, first deadline information indicating a deadline for transmitting answer information for teaching material contents, a first print of which was sent in advance, from a multifunction peripheral to the server apparatus, a first notifying unit configured to notify second deadline information corresponding to the first deadline information to at least one of a smartphone and the multifunction peripheral, and a second notifying unit configured to notify, to the personal computer, deadline determination information indicating whether an answer image has been received from the multifunction peripheral by the deadline. The multifunction peripheral includes a reading executing unit configured to read a second print including an image corresponding to the answer information and generate the answer image and a transmitting unit configured to transmit the answer image to the server apparatus.

10 Claims, 5 Drawing Sheets

(52) U.S. Cl.
CPC ..... *H04N 1/00244* (2013.01); *H04N 1/32101*
(2013.01); *H04N 2201/0094* (2013.01)

(58) Field of Classification Search
CPC ........... H04N 1/00074; H04N 1/00204; H04N
1/00244; H04N 1/342; G06F 3/1207;
G06F 3/1288; G09B 5/02; G09B 7/02
USPC ...................................................... 358/1.15
See application file for complete search history.

(56) References Cited

U.S. PATENT DOCUMENTS

| | | | | |
|---|---|---|---|---|
| 8,565,601 | B2* | 10/2013 | Nakura | H04B 10/272 |
| | | | | 398/140 |
| 9,407,783 | B2* | 8/2016 | Yamamoto | H04N 1/2338 |
| 9,641,719 | B2* | 5/2017 | Oneda | H04N 1/2108 |
| 10,155,170 | B2* | 12/2018 | Ikeda | A63F 13/213 |
| 11,315,081 | B2* | 4/2022 | Fujimura | G06Q 10/06 |
| 2005/0114696 | A1* | 5/2005 | Hashimoto | G06F 21/34 |
| | | | | 726/26 |
| 2006/0185023 | A1* | 8/2006 | Sato | H04N 21/42646 |
| | | | | 348/E7.071 |
| 2008/0117456 | A1* | 5/2008 | Yamaguchi | H04N 1/32144 |
| | | | | 358/1.15 |
| 2008/0183650 | A1* | 7/2008 | Komamura | G06Q 10/10 |
| | | | | 706/21 |
| 2009/0141305 | A1* | 6/2009 | Inui | H04N 1/00209 |
| | | | | 358/1.15 |
| 2014/0268270 | A1* | 9/2014 | Shimizu | H02K 11/24 |
| | | | | 359/221.3 |
| 2018/0268270 | A1* | 9/2018 | Ono | G06F 3/1285 |
| 2018/0316825 | A1* | 11/2018 | Ito | H04N 1/00519 |
| 2021/0090142 | A1* | 3/2021 | Yang | G06Q 20/085 |
| 2022/0017318 | A1* | 1/2022 | Arai | B65H 5/062 |

* cited by examiner

DEADLINE MANAGEMENT SYSTEM, CONTROL METHOD FOR DEADLINE MANAGEMENT SYSTEM, AND INFORMATION PROCESSING APPARATUS

The present application is based on, and claims priority from JP Application Serial Number 2022-149121, filed Sep. 20, 2022, the disclosure of which is hereby incorporated by reference herein in its entirety.

BACKGROUND

1. Technical Field

The present disclosure relates to a deadline management system, a control method for a deadline management system, and an information processing apparatus.

2. Related Art

JP-A-2004-333525 (Patent Literature 1) discloses a system that prints teaching material contents.

However, in the system described in Patent Literature 1, it is likely that a deadline of an answer to a test, a learning material, or the like requested to be submitted by a predetermined deadline cannot be managed.

SUMMARY

A deadline management system according to an aspect for solving the problem described above is a deadline management system including a first terminal apparatus, a second terminal apparatus, a reading apparatus, and an each of the first terminal apparatus, the second terminal apparatus, and the reading apparatus. The information processing apparatus includes: an accepting unit configured to accept, from the first terminal apparatus, first deadline information indicating a deadline for transmitting answer information for contents, a first print of which was sent in advance, from the reading apparatus to the information processing apparatus; a first notifying unit configured to notify second deadline information corresponding to the first deadline information to at least one of the second terminal apparatus and the reading apparatus; and a second notifying unit configured to notify, to the first terminal apparatus, deadline determination information indicating whether an answer image including an image corresponding to the answer information was received from the reading apparatus by the deadline. The reading apparatus includes: a reading executing unit configured to read a second print including the image corresponding to the answer information and generate the answer image; and a transmitting unit configured to transmit the answer image to the information processing apparatus.

A control method for a deadline management system according to another aspect for solving the problem described above is a control method for a deadline management system including a first terminal apparatus, a second terminal apparatus, a reading apparatus, and an each of the first terminal apparatus, the second terminal apparatus, and the reading apparatus. The information processing apparatus executes: an accepting step for accepting, from the first terminal apparatus, first deadline information indicating a deadline for transmitting answer information for contents, a first print of which was sent in advance, from the reading apparatus to the information processing apparatus; a first notifying step for notifying second deadline information corresponding to the first deadline information to at least one of the second terminal apparatus and the reading apparatus; and a second notifying step for notifying, to the first terminal apparatus, deadline determination information indicating whether an answer image including an image corresponding to the answer information was received from the reading apparatus by the deadline. The reading apparatus executes: a reading executing step for reading a second print including the image corresponding to the answer information and generating the answer image; and a transmitting step for transmitting the answer image to the information processing apparatus.

An information processing apparatus according to still another aspect for solving the problem described above is an information processing apparatus communicably connected to each of a first terminal apparatus, a second terminal apparatus, and a reading apparatus. The information processing apparatus includes: an accepting unit configured to accept, from the first terminal apparatus, first deadline information indicating a deadline for transmitting answer information for contents, a first print of which was sent in advance, from the reading apparatus to the information processing apparatus; a first notifying unit configured to notify second deadline information corresponding to the first deadline information to at least one of the second terminal apparatus and the reading apparatus; and a second notifying unit configured to notify, to the first terminal apparatus, deadline determination information indicating whether an answer image including an image corresponding to the answer information was received from the reading apparatus by the deadline.

DESCRIPTION OF EMBODIMENTS

An embodiment is explained below with reference to the drawings.

Figure 1:
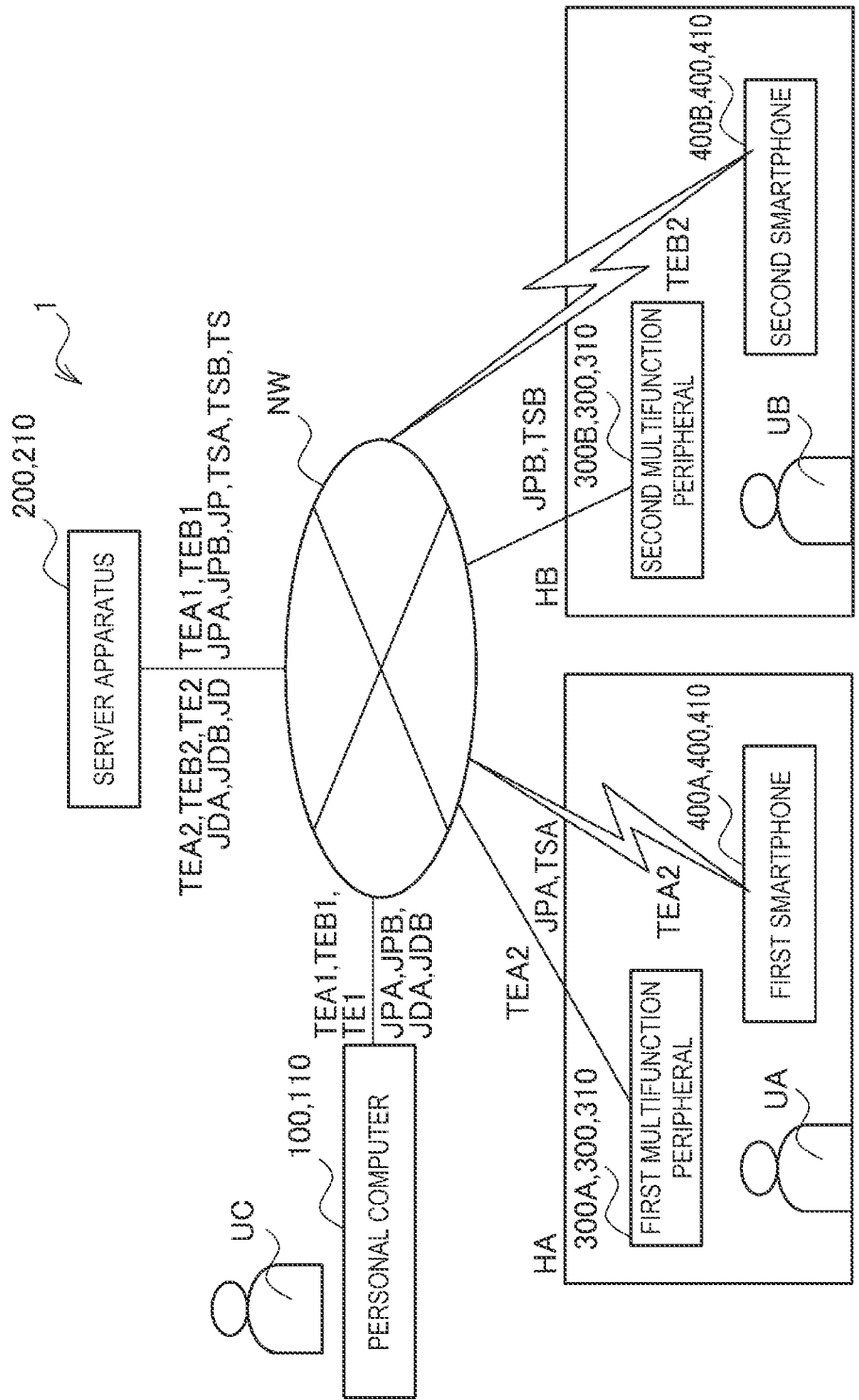
FIG. 1 is a diagram showing an example of a configuration of a deadline management system according to an embodiment.

First, a configuration of a deadline management system 1 according to this embodiment is explained with reference to FIG. 1. FIG. 1 is a diagram showing an example of the configuration of the deadline management system 1 according to this embodiment. As shown in FIG. 1, the deadline management system 1 includes a personal computer 100, a server apparatus 200, a multifunction peripheral 300, and a smartphone 400.

The server apparatus 200 is communicably connected to each of the personal computer 100, the multifunction peripheral 300, and the smartphone 400 via a network NW. The network NW is, for example, the Internet.

In this embodiment, the network NW is the Internet. However, not only this, but, for example, the network NW may be a LAN (Local Area Network) or may be a WAN (Wide Area Network).

The multifunction peripheral 300 includes a first multifunction peripheral 300A and a second multifunction peripheral 300B. The smartphone 400 includes a first smartphone 400A and a second smartphone 400B. As shown in FIG. 1, the first multifunction peripheral 300A is disposed in a living room HA of a first user UA and the second multifunction peripheral 300B is disposed in a living room HB of a second user UB. The first smartphone 400A is used by the first user UA and the second smartphone 400B is used by the second user UB. Each of the first user UA and the second user UB is, for example, a student.

The multifunction peripheral 300 corresponds to an example of the "reading apparatus".

The multifunction peripheral 300 corresponds to an example of the "printing apparatus".

In this embodiment, the "reading apparatus" and the "printing apparatus" are integrally configured as the multifunction peripheral 300. However, not only this, but the "reading apparatus" and the "printing apparatus" may be configured as separate apparatuses. For example, the "reading apparatus" may be configured as a scanner and the "printing apparatus" may be configured as a printer.

The personal computer 100 transmits, to the server apparatus 200, first deadline information TE1 indicating a deadline TL for transmitting answer information JR for teaching material contents CT from the multifunction peripheral 300 to the server apparatus 200. The teaching material contents CT are printed in advance and sent to each of the first user UA and the second user UB as a first print P1. For example, the teaching material contents CT are printed in advance on the first print P1 in the first multifunction peripheral 300A based on an instruction from the personal computer 100. The first print P1 is provided to the first user UA. The teaching material contents CT are printed in advance on the first print P1 in the second multifunction peripheral 300B based on an instruction from the personal computer 100. The first print P1 is provided to the second user UB.

The teaching material contents CT are, problems or issues of subjects such as English and mathematics.

The first print P1 is further explained with reference to FIG. 3.

In this embodiment, each of the first multifunction peripheral 300A and the second multifunction peripheral 300B prints the teaching material contents CT on printing paper of a predetermined size as the first print P1. The predetermined size is, for example, an A4 size defined by the ISO (International Organization for Standardization) 216. That is, the teaching material contents CT are printed by each of the first multifunction peripheral 300A and the second multifunction peripheral 300B, whereby the teaching material contents CT are printed on the printing paper of the A4 size as the first print P1.

In this embodiment, each of the first multifunction peripheral 300A and the second multifunction peripheral 300B prints the teaching material contents CT on the printing paper of the A4 size defined by the ISO 216. However, not only this, but each of the first multifunction peripheral 300A and the second multifunction peripheral 300B only has to print the teaching material contents CT on the printing paper of the predetermined size. The predetermined size may be, for example, a B5 size defined by the ISO 216 or may be an A3 size defined by the ISO 216.

The personal computer 100 transmits the first deadline information TE1 to the server apparatus 200, for example, according to operation from a third user UC. The first deadline information TE1 indicates the deadline TL for transmitting the answer information JR for the teaching material contents CT from the multifunction peripheral 300 to the server apparatus 200.

The personal computer 100 transmits first deadline information TEA1 to the server apparatus 200, for example, according to operation from the third user UC. The first deadline information TEA1 corresponds to an example of the first deadline information TE1. The first deadline information TEA1 indicates the deadline TL for transmitting the answer information JR for the teaching material contents CT from the first multifunction peripheral 300A to the server apparatus 200. In other words, the first deadline information TEA1 is a date and time designated by the third user UC as the deadline TL for the first user UA to transmit the answer information JR for the teaching material contents CT from the first multifunction peripheral 300A to the server apparatus 200.

The personal computer 100 transmits first deadline information TEB1 to the server apparatus 200, for example, according to operation from the third user UC. The first deadline information TEB1 corresponds to an example of the first deadline information TE1. The first deadline information TEB1 indicates the deadline TL for transmitting the answer information JR for the teaching material contents CT from the second multifunction peripheral 300B to the server apparatus 200. In other words, the first deadline information TEB1 is a date and time designated by the third user UC as the deadline TL for the second user UB to transmit the answer information JR for the teaching material contents CT from the second multifunction peripheral 300B to the server apparatus 200.

The third user UC is a user who provides the teaching material contents CT to the first user UA and the second user UB. In other words, the third user UC is a user who requests each of the first user UA and the second user UB to transmit the answer information JR for the teaching material contents CT. The third user UC is, for example, a teacher.

The answer information JR is further explained with reference to FIG. 3.

The teaching material contents CT correspond to an example of the "contents".

Each of the first deadline information TEA1 and the first deadline information TEB1 corresponds to an example of the "first deadline information". In this embodiment, the "first deadline information" is information indicating a date and time of the deadline TL. The "date and time" indicates, for example, year, month, and day and time. The "time" indicates hour, minute, and second.

In this embodiment, the "contents" are the teaching material contents CT. However, not only this, but the "contents" only have to be a document or the like that is printed by the multifunction peripheral 300 and requests the first user UA and the second user UB to transmit answers. For example, the "contents" may be questionnaires to the first user UA and the second user UB.

The personal computer 100 includes a first control unit 110. The first control unit 110 includes a first processor such as a CPU (Central Processing Unit) and a first memory such as a ROM (Read Only Memory) or a RAM (Random Access Memory) and controls the units of the personal computer 100. The first memory stores a first control program. The first memory may include a magnetic storage device such as a HDD (Hard Disk Drive) or a semiconductor storage device such as an SSD (Solid State Drive).

In the first control unit 110, the first processor reads the first control program stored in the first memory and executes processing. In other words, the first control unit 110 executes processing through cooperation of hardware and software.

The first processor may be configured by a single processor or a plurality of processors may function as the first processor.

In this embodiment, the first processor executes the first control program to control the units of the personal computer 100. However, not only this, but the first control unit 110 may include, for example, an ASIC (Application Specific Integrated Circuit) and the ASIC may execute processing with a function implemented in the ASIC. The first control unit 110 may include, for example, a signal processing circuit and the signal processing circuit may perform signal processing to execute processing.

The personal computer 100 corresponds to an example of the "first terminal apparatus".

When receiving the first deadline information TE1 from the personal computer 100, the server apparatus 200 notifies second deadline information TE2 corresponding to the first deadline information TE1 to the multifunction peripheral 300 and the smartphone 400 by transmitting the second deadline information TE2 to the multifunction peripheral 300 and the smartphone 400.

In this embodiment, when receiving the first deadline information TE1, the server apparatus 200 transmits the second deadline information TE2 corresponding to the first deadline information TE1 to the multifunction peripheral 300 and the smartphone 400. However, not only this, but the server apparatus 200 only has to transmit the second deadline information TE2 corresponding to the first deadline information TE1 to at least one of the multifunction peripheral 300 and the smartphone 400.

For example, when receiving the first deadline information TEAL from the personal computer 100, the server apparatus 200 notifies second deadline information TEA2 corresponding to the first deadline information TEAL to the first multifunction peripheral 300A and the first smartphone 400A by transmitting the second deadline information TEA2 to the first multifunction peripheral 300A and the first smartphone 400A. The second deadline information TEA2 corresponds to an example of the second deadline information TE2.

For example, when receiving the first deadline information TEB1 from the personal computer 100, the server apparatus 200 notifies second deadline information TEB2 corresponding to the first deadline information TEB1 to the second multifunction peripheral 300B and the second smartphone 400B by transmitting the second deadline information TEB2 to the second multifunction peripheral 300B and the second smartphone 400B. The second deadline information TEB2 corresponds to an example of the second deadline information TE2.

The second deadline information TE2, the second deadline information TEA2, and the second deadline information TEB2 are further explained with reference to FIG. 2.

A configuration of the server apparatus 200 is further explained with reference to FIG. 2.

The server apparatus 200 corresponds to an example of the "information processing apparatus".

The multifunction peripheral 300 reads a second print P2 including an image corresponding to answer information JR and generates an answer image JP. The second print P2 is a print obtained by the first user UA or the second user UB writing answers to the teaching material contents CT in the first print P1. The answer image JP includes the image corresponding to the answer information JR and an image corresponding to the teaching material contents CT. The multifunction peripheral 300 transmits the answer image JP to the server apparatus 200.

The multifunction peripheral 300 transmits a start date and time TS, which is a date and time when the multifunction peripheral 300 started to read the second print P2, to the server apparatus 200.

The first print P1 and the second print P2 are further explained with reference to FIG. 3.

The first multifunction peripheral 300A reads a second print P2A including an image corresponding to first answer information JRA and generates a first answer image JPA. The second print P2A is a print obtained by the first user UA writing answers to the teaching material contents CT in the first print P1. The first answer information JRA indicates answers of the first user UA to the teaching material contents CT. The first answer image JPA includes the image corresponding to the first answer information JRA and the image corresponding to the teaching material contents CT. The first multifunction peripheral 300A transmits the first answer image JPA to the server apparatus 200.

The first multifunction peripheral 300A transmits a first start date and time TSA, which is a date and time when the first multifunction peripheral 300A started to read the second print P2A, to the server apparatus 200.

The first answer information JRA corresponds to an example of the answer information JR. The second print P2A corresponds to an example of the second print P2. The first answer image JPA corresponds to an example of the answer image JP. The first start date and time TSA corresponds to an example of the start date and time TS.

A configuration of the first multifunction peripheral 300A is further explained with reference to FIG. 3.

The second multifunction peripheral 300B reads a second print P2B including an image corresponding to second answer information JRB and generates a second answer image JPB. The second print P2B is a print obtained by the second user UB writing answers to the teaching material contents CT in the first print P1. The second answer information JRB indicates answers of the second user UB to the teaching material contents CT. The second answer image JPB includes the image corresponding to the second answer information JRB and the image corresponding to the teaching material contents CT. The second multifunction peripheral 300B transmits the second answer image JPB to the server apparatus 200.

The second multifunction peripheral 300B transmits a second start date and time TSB, which is a date and time when the second multifunction peripheral 300B started to read the second print P2B, to the server apparatus 200.

The second answer information JRB corresponds to an example of the answer information JR. The second print P2B corresponds to an example of the second print P2. The second answer image JPB corresponds to an example of the answer image JP. The second start date and time TSB corresponds to an example of the start date and time TS.

A configuration of the second multifunction peripheral 300B is further explained with reference to FIG. 3.

The smartphone 400 is communicably connected to the network NW via wireless communication such as Wi-Fi (registered trademark). The smartphone 400 receives the second deadline information TE2 from the server apparatus 200. The smartphone 400 includes the first smartphone 400A and the second smartphone 400B.

The first smartphone 400A receives the second deadline information TEA2 from the server apparatus 200. The second smartphone 400B receives the second deadline information TEB2 from the server apparatus 200.

When receiving the second deadline information TEA2 from the server apparatus 200, the first smartphone 400A displays an image indicating the second deadline information TEA2 on an LCD (Liquid Crystal Display) of the first smartphone 400A.

When receiving the second deadline information TEB2 from the server apparatus 200, the second smartphone 400B displays an image indicating the second deadline information TEB2 on an LCD of the second smartphone 400B.

Each of the smartphone 400, the first smartphone 400A, and the second smartphone 400B corresponds to an example of the "second terminal apparatus".

In this embodiment, when receiving the second deadline information TEA2, the first smartphone 400A displays the image indicating the second deadline information TEA2 on the LCD. However, not only this, but, for example, the first smartphone 400A may receive, as the second deadline information TEA2, an electronic mail including the second deadline information TEA2.

In this embodiment, when receiving the second deadline information TEB2, the second smartphone 400B displays the image indicating the second deadline information TEB2 on the LCD. However, not only this, but, for example, the second smartphone 400B may receive, as the second deadline information TEB2, an electronic mail including the second deadline information TEB2.

The server apparatus 200 receives the start date and time TS and the answer image JP from the multifunction peripheral 300. The server apparatus 200 generates deadline determination information JD based on the start date and time TS and the first deadline information TE1 and transmits the deadline determination information JD and the answer image JP to the personal computer 100. The deadline determination information JD indicates whether the answer image JP including the image corresponding to the answer information JR has been received from the multifunction peripheral 300 by the deadline TL.

The start date and time TS includes the first start date and time TSA and the second start date and time TSB. The answer image JP includes the first answer image JPA and the second answer image JPB.

The server apparatus 200 receives the first start date and time TSA and the first answer image JPA from the first multifunction peripheral 300A. The server apparatus 200 receives the second start date and time TSB and the second answer image JPB from the second multifunction peripheral 300B.

The deadline determination information JD includes first deadline determination information JDA and second deadline determination information JDB. The first deadline determination information JDA indicates whether the first answer image JPA has been received from the first multifunction peripheral 300A by the deadline TL. The second deadline determination information JDB indicates whether the second answer image JPB has been received from the second multifunction peripheral 300B by the deadline TL.

The deadline determination information JD, the first deadline determination information JDA, and the second deadline determination information JDB are further explained with reference to FIG. 2.

When receiving the answer image JP from the multifunction peripheral 300, the server apparatus 200 transmits the answer image JP to the personal computer 100. The answer image JP includes the first answer image JPA and the second answer image JPB.

The personal computer 100 receives the deadline determination information JD and the answer image JP from the server apparatus 200. For example, the personal computer 100 receives the first deadline determination information JDA, the first answer image JPA, the second deadline determination image JDB, and the second answer image JPB from the server apparatus 200.

The personal computer 100 stores the first answer image JPA and the second answer image JPB in the memory, for example, the HDD.

When the first deadline determination information JDA indicates that the first answer image JPA has not been received from the first multifunction peripheral 300A by the deadline TL, the personal computer 100 displays, on the LCD, an image indicating that an answer has not been received from the first user UA by the deadline TL. When the second deadline determination information JDB indicates that the second answer image JPB has not been received from the first multifunction peripheral 300A by the deadline TL, the personal computer 100 displays, on the LCD, an image indicating that an answer has not been received from the second user UB by the deadline TL.

Subsequently, the configuration of the server apparatus 200 is explained with reference to FIG. 2. FIG. 2 is a diagram showing an example of the configuration of the server apparatus 200 according to this embodiment. As shown in FIG. 2, the server apparatus 200 includes a second control unit 210, a second operation mechanism 220, a second display mechanism 230, and a second communication interface 240. The second control unit 210 includes a second processor 210A and a second memory 210B. The second control unit 210 controls operations of the units of the server apparatus 200.

The second operation mechanism 220, the second display mechanism 230, and the second communication interface 240 are connected to the second control unit 210.

The second operation mechanism 220 includes various keys and buttons and accepts operation from a user. The user is, for example, an administrator of the server apparatus 200. The second operation mechanism 220 generates an operation signal corresponding to the accepted operation and outputs the generated operation signal to the second control unit 210.

The second display mechanism 230 includes an LCD and displays various images on the LCD according to an instruction from the second control unit 210.

The second communication interface 240 includes a connector and an interface circuit and is connected to the second control unit 210. In this embodiment, the second communication interface 240 is an interface for communicating with each of the personal computer 100, the multifunction peripheral 300, and the smartphone 400, for example, according to the Ethernet (registered trademark) standard.

The second processor 210A is configured by a CPU, a DSP (Digital Signal Processor), a microcomputer, or the like. The second processor 210A may be configured by a plurality of processors or may be configured by a single processor.

The second processor 210A may be hardware programmed to realize functions of units explained below. That is, a second control program PG2 may be implemented on the second processor 210A as a hardware circuit. In this case, for example, the second processor 210A is configured by an ASIC, an FPGA (Field-Programmable Gate Array), or the like.

In the following explanation, the second processor 210A executes the second control program PG2 to thereby realize various functions of the second control unit 210.

The second memory 210 includes a storage region for storing a program to be executed by the second processor 210A and data to be processed by the second processor 210A. The second memory 210B stores the second control program PG2 to be executed by the second processor 210A and various image data, setting data, and the like concerning an operation of the server apparatus 200.

The second memory 210B includes a nonvolatile storage region for storing a program and data in a nonvolatile manner. The second memory 210B may include, for example, a ROM, a HDD, or an SSD as the nonvolatile memory region. The second memory 210B may include a volatile storage region and configure a work area for temporality storing a program to be executed by the second processor 210A and processing target data. The second memory 210B may include, for example, a RAM as the volatile storage region.

Figure 2:
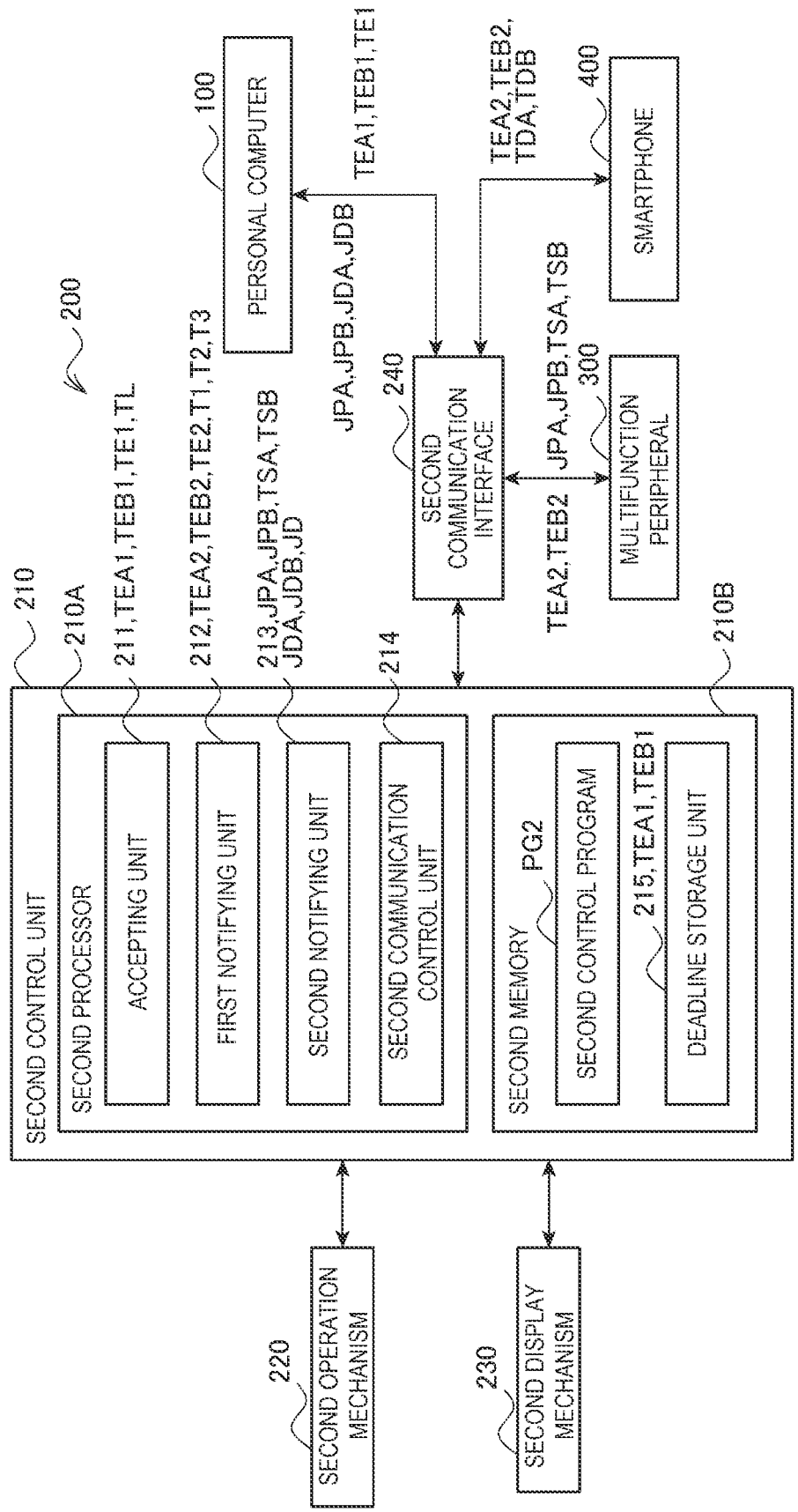
FIG. 2 is a diagram showing an example of a configuration of a server apparatus according to the embodiment.

As shown in FIG. 2, the second control unit 210 includes an accepting unit 211, a first notifying unit 212, a second notifying unit 213, a second communication control unit 214, and a deadline storage unit 215. For example, the second processor 210A executes the second control program PG2, whereby these units are realized by cooperation of software and hardware.

The deadline storage unit 215 stores the first deadline information TE1. The first deadline information TE1 includes the first deadline information TEAL and the first deadline information TEB1.

The first deadline information TE1 is accepted by being received from the personal computer 100 by the accepting unit 211 and is stored in the deadline storage unit 215 by the accepting unit 211.

The accepting unit 211 accepts the first deadline information TE1 by receiving the first deadline information TE1 from the personal computer 100. The first deadline information TE1 includes the first deadline information TEAL and the first deadline information TEB1.

In this embodiment, the accepting unit 211 accepts the first deadline information TEAL and the first deadline information TEB1 by receiving the first deadline information TEAL and the first deadline information TEB1 from the personal computer 100. The first deadline information TEAL indicates the deadline TL for transmitting the answer information JR for the teaching material contents CT from the first multifunction peripheral 300A to the server apparatus 200. The first deadline information TEB1 indicates the deadline TL for transmitting the answer information JR for the teaching material contents CT from the second multifunction peripheral 300B to the server apparatus 200. The deadline TL indicated by the first deadline information TEB1 is, for example, the same date and time as the deadline indicated by the first deadline information TEA1. Note that the deadline TL indicated by the first deadline information TEB1 may be a date and time different from the deadline indicated by the first deadline information TEA1.

The first notifying unit 212 notifies, at predetermined timing, the second deadline information TE2 corresponding to the first deadline information TE1 to the multifunction peripheral 300 and the smartphone 400 by transmitting the second deadline information TE2 to the multifunction peripheral 300 and the smartphone 400. The second deadline information TE2 includes second deadline information TEA2 and second deadline information TEB2.

The first notifying unit 212 notifies, at the predetermined timing, the second deadline information TEA2 corresponding to the first deadline information TEAL to the first multifunction peripheral 300A and the first smartphone 400A by transmitting the second deadline information TEA2 to the first multifunction peripheral 300A and the first smartphone 400A.

The second deadline information TEA2 includes at least one of date and time information of the deadline TL and period information indicating a period until the deadline TL.

The predetermined timing includes, for example, first timing T1 when the accepting unit 211 has accepted the first deadline information TEAL from the personal computer 100. At the first timing T1, the first notifying unit 212 transmits, for example, the date and time information of the deadline TL serving as the second deadline information TEA2 to the first multifunction peripheral 300A and the first smartphone 400A.

In this embodiment, the accepting unit 211 accepts the first deadline information TEAL from the personal computer 100 at the first timing T1 when the period until the deadline TL is longer than three days.

The predetermined timing includes second timing T2 when the period until the deadline TL is three days. At the second timing T2, the first notifying unit 212 transmits, for example, as the second deadline information TEA2, period information indicating that the period until the deadline TL is three days to the first multifunction peripheral 300A and the first smartphone 400A.

The predetermined timing includes third timing T3 when the period until the deadline TL is one day. At the third timing T3, the first notifying unit 212 transmits, for example, as the second deadline information TEA2, period information indicating that the period until the deadline TL is one day to the first multifunction peripheral 300A and the first smartphone 400A.

In this embodiment, the accepting unit 211 accepts the first deadline information TEB1 from the personal computer 100 at the first timing T1 when the period until the deadline TL is longer than three days.

The predetermined timing includes the second timing T2 when the period until the deadline TL is three days. At the second timing T2, the first notifying unit 212 transmits, for example, as the second deadline information TEB2, the period information indicating that the period until the deadline TL is three days to the second multifunction peripheral 300B and the second smartphone 400B.

The predetermined timing includes the third timing T3 when the period until the deadline TL is one day. At the third timing T3, the first notifying unit 212 transmits, for example, as the second deadline information TEB2, the period information indicating that the period until the deadline TL is one day to the second multifunction peripheral 300B and the second smartphone 400B.

In this embodiment, the predetermining timing includes the first timing T1, the second timing T2, and the third timing T3. However, not only this, but, for example, the predetermined timing may include one or two timings. For example, the predetermined timing may include four or more timings.

The second notifying unit 213 receives the start date and time TS and the answer image JP from the multifunction peripheral 300. The second notifying unit 213 receives the first start date and time TSA and the first answer image JPA from the first multifunction peripheral 300A. The second notifying unit 213 receives the second start date and time TSB and the second answer image JPB from the second multifunction peripheral 300B.

The second notifying unit 213 determines, based on the start date and time TS and the first deadline information TE1, whether the answer image JP has been received from the multifunction peripheral 300 by the deadline TL and generates the deadline determination information JD.

The second notifying unit 213 determines, based on the first deadline information TEAL and the first start date and time TSA, whether the first answer image JPA has been received from the first multifunction peripheral 300A by the deadline TL and generates the first deadline determination information JDA. The first deadline determination information JDA indicates whether the first answer image JPA has been received from the first multifunction peripheral 300A by the deadline TL.

For example, when the first start date and time TSA is a date and time until the deadline TL indicated by the first deadline information TEAL, the second notifying unit 213 executes the following processing. That is, the second notifying unit 213 generates, as the first deadline determination information JDA, information indicating that the first answer image JPA has been received from the first multifunction peripheral 300A by the deadline TL. For example, when the first start date and time TSA is not the date and time until the deadline TL indicated by the first deadline information TEAL, the second notifying unit 213 executes the following processing. That is, the second notifying unit 213 generates, as the first deadline determination information JDA, information indicating that the first answer image JPA has not been received from the first multifunction peripheral 300A by the deadline TL.

The second notifying unit 213 determines, based on the first deadline information TEB1 and the second start date and time TSB, whether the second answer image JPB has been received from the second multifunction peripheral 300B by the deadline TL and generates the second deadline determination information JDB. The second deadline determination information JDB indicates whether the second answer image JPB has been received from the second multifunction peripheral 300B by the deadline TL.

For example, when the second start date and time TSB is a date and time until the deadline TL indicated by the first deadline information TEB1, the second notifying unit 213 executes the following processing. That is, the second notifying unit 213 generates, as the second deadline determination information JDB, information indicating that the second answer image JPB has been received from the second multifunction peripheral 300B by the deadline TL. For example, when the second start date and time TSB is not the date and time until the deadline TL indicated by the first deadline information TEB1, the second notifying unit 213 executes the following processing. That is, the second notifying unit 213 generates, as the second deadline determination information JDB, information indicating that the second answer image JPB has not been received from the second multifunction peripheral 300B by the deadline TL.

In this embodiment, the second notifying unit 213 determines, based on the start date and time TS and the first deadline information TE1, whether the answer image JP has been received from the multifunction peripheral 300 by the deadline TL and generates the deadline determination information JD. However, not only this, but the second notifying unit 213 may determine, for example, based on the first deadline information TE1 and a date and time when the answer image JP was received, whether the answer image JP has been received from the multifunction peripheral 300 by the deadline TL.

For example, when the date and time when the answer image JP was received is a date and time until the deadline TL indicated by the first deadline information TE1, the second notifying unit 213 executes the following processing. That is, the second notifying unit 213 generates, as the deadline determination information JD, information indicating that the answer image JP has been received from the multifunction peripheral 300 by the deadline TL. When the answer image JP has not been received at the date and time by the deadline TL indicated by the first deadline information TE1, the second notifying unit 213 executes the following processing. That is, the second notifying unit 213 generates, as the deadline determination information JD, information indicating that the answer image JP has not been received from the multifunction peripheral 300 by the deadline TL.

The second notifying unit 213 notifies the deadline determination information JD to the personal computer 100 by transmitting the deadline determination information JD to the personal computer 100. The deadline determination information JD includes the first deadline determination information JDA and the second deadline determination information JDB.

For example, the second notifying unit 213 notifies the first deadline determination information JDA to the personal computer 100 by transmitting the first deadline determination information JDA to the personal computer 100. For example, the server apparatus 200 notifies the second deadline determination information JDB indicating whether the second answer image JPB has been received to the personal computer 100 by transmitting the second deadline determination information JDB to the personal computer 100.

When the answer image JP has not been received from the multifunction peripheral 300 by the deadline TL, by transmitting the deadline determination information JD to the smartphone 400, the second notifying unit 213 notifies, to the smartphone 400, that the answer image JP has not been received from the multifunction peripheral 300 by the deadline TL. The deadline determination information JD includes the first deadline determination information JDA and the second deadline determination information JDB.

For example, the second notifying unit 213 notifies the first deadline determination information JDA to the first smartphone 400A by transmitting the first deadline determination information JDA to the first smartphone 400A. For example, the server apparatus 200 notifies the second deadline determination information JDB, which indicates whether the second answer image JPB has been received, to the second smartphone 400B by transmitting the second deadline determination information JDB to the second smartphone 400B.

The second notifying unit 213 transmits the answer image JP to the personal computer 100. The answer image JP includes the first answer image JPA and the second answer image JPB.

For example, when receiving the first answer image JPA from the first multifunction peripheral 300A, the server apparatus 200 transmits the first answer image JPA to the personal computer 100. For example, when receiving the second answer image JPB from the second multifunction peripheral 300B, the server apparatus 200 transmits the second answer image JPB to the personal computer 100.

The second communication control unit 214 receives the first deadline information TEA1 and the first deadline information TEB1 from the personal computer 100.

The second communication control unit 214 transmits the second deadline information TEA2 to the first multifunction peripheral 300A and the first smartphone 400A at predetermined timing. The second communication control unit 214 transmits the second deadline information TEB2 to the second multifunction peripheral 300B and the second smartphone 400B at the predetermined timing.

The second communication control unit 214 receives the first start date and time TSA and the first answer image JPA from the first multifunction peripheral 300A. The second communication unit 214 receives the second start date and time TSB and the second answer image JPB from the second multifunction peripheral 300B.

The second communication control unit 214 transmits the first deadline determination information JDA and the second deadline determination information JDB to the personal computer 100. The second communication control unit 214 transmits the first deadline determination information JDA to the first smartphone 400A. The second communication control unit 214 transmits the second deadline determination information JDB to the second smartphone 400B. The second communication control unit 214 transmits the first answer image JPA and the second answer image JPB to the personal computer 100.

Subsequently, the multifunction peripheral 300 according to this embodiment is explained with reference to FIG. 3. FIG. 3 is a diagram showing an example of a configuration of the multifunction peripheral 300 according to this embodiment. The multifunction peripheral 300 includes an image reading function and a printing function. The image reading function is a function of reading characters, images, and the like formed on a printing medium M such as printing paper. The printing function is a function of printing characters, images, and the like on the printing medium M such as printing paper.

First, the first multifunction peripheral 300A is explained with reference to FIG. 3. The configuration of the second multifunction peripheral 300B is substantially the same as the configuration of the first multifunction peripheral 300A. Therefore, in the following explanation, differences from the first multifunction peripheral 300A are mainly explained.

Figure 3:
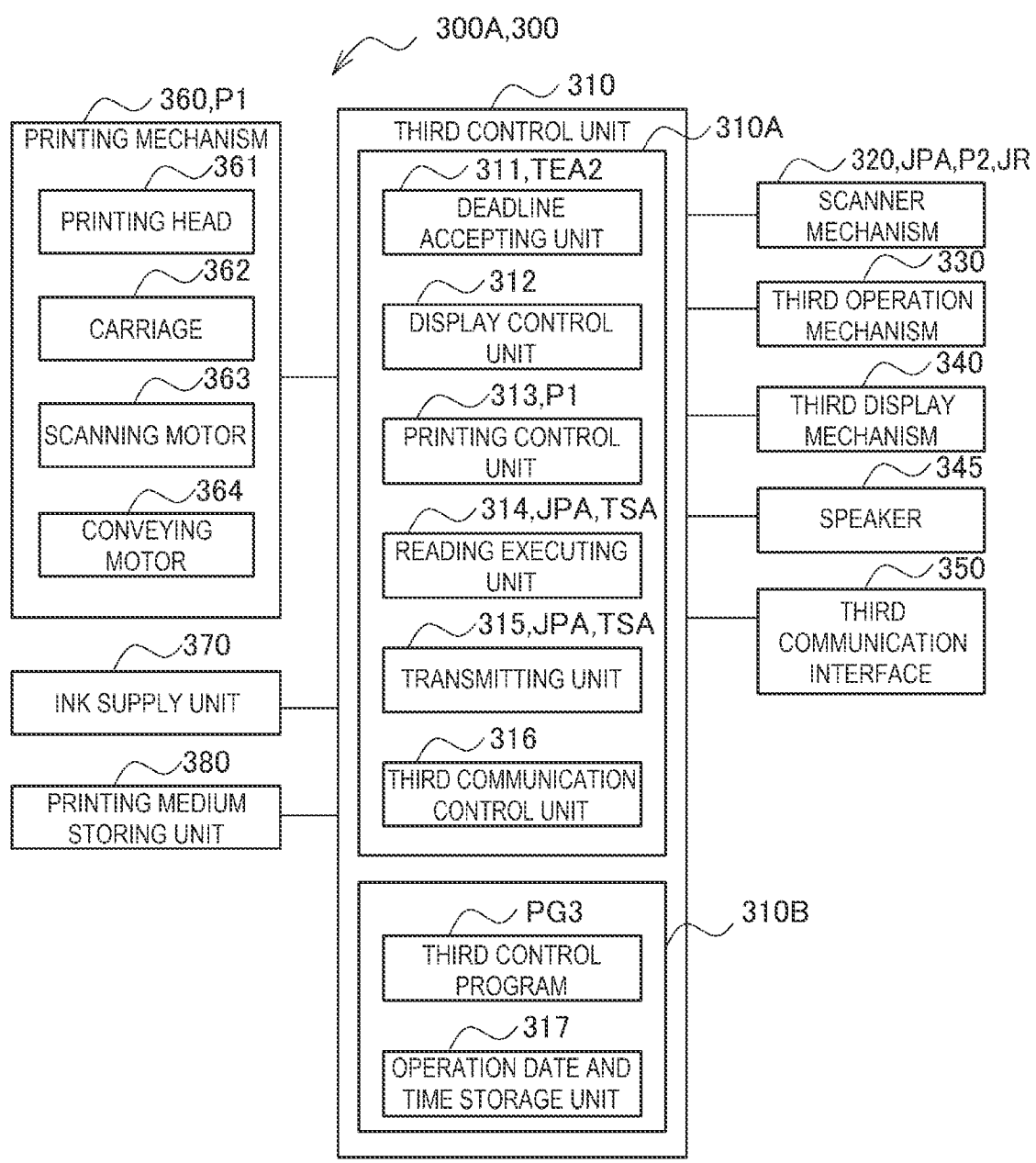
FIG. 3 is a diagram showing an example of a configuration of a multifunction peripheral according to the embodiment.

As shown in FIG. 3, the first multifunction peripheral 300A includes a third control unit 310, a scanner mechanism 320, a third operation mechanism 330, a third display mechanism 340, a speaker 345, a third communication interface 350, a printing mechanism 360, an ink supply unit 370, and a printing medium storing unit 380.

The third control unit 310 includes a third processor 310A such as a CPU and a third memory 310B such as a ROM or a RAM and controls the units of the multifunction peripheral 300. The third memory 310B stores a third control program PG3. The third memory 310B may include a magnetic storage device such as a HDD or a semiconductor storage device such as an SSD.

In the third control unit 310, the third processor 310A reads the third control program PG3 stored in the third memory 310B and executes processing. In other words, the third control unit 310 executes processing through cooperation of hardware and software.

The third processor 310A may be configured by a single processor or a plurality of processors may function as the third processor 310A.

In this embodiment, the third processor 310A executes the third control program PG3 to control the units of the multifunction peripheral 300. However, not only this, but the third control unit 310 may include, for example, an ASIC and the ASIC may execute processing with a function implemented on the ASIC. The third control unit 310 may include, for example, a signal processing circuit and the signal processing circuit may perform signal processing to execute processing.

The scanner mechanism 320 includes an image sensor such as a CCD (Charge Coupled Device), a CMOS (Complementary Metal Oxide Semiconductor), or a CIS (Contact Image Sensor), reads an image printed on the printing medium M such as printing paper, and generates image data.

The scanner mechanism 320 executes an image reading function. In other words, the scanner mechanism 320 configures a part of the "reading apparatus".

The third operation mechanism 330 includes input means such as an operation switch or a touch panel provided in the first multifunction peripheral 300A, detects operation on the input means by the first user UA, and outputs a detection signal corresponding to the operation to the third control unit 310. The third control unit 310 executes processing corresponding to the operation by the first user UA based on an input from the third operation mechanism 330.

The third display mechanism 340 includes a plurality of LEDs (Light Emitting Diodes) and a display panel and executes lighting, extinction, and flashing in predetermined modes of the LEDs, display of information on the display panel, and the like according to control by the third control unit 310.

The speaker 345 outputs voice according to the control by the third control unit 310.

The printing mechanism 360 prints, with ink, characters, images, and the like on the printing medium M such as printing paper according to the control by the third control unit 310. The printing mechanism 360 includes a printing head 361, a carriage 362, a scanning motor 363, and a conveying motor 364 as components relating to printing.

The printing head 361 is an ink-jet type and ejects ink supplied from the ink supply unit 370 toward the printing medium M. The carriage 362 is mounted with the printing head 361 and performs scanning in a main scanning direction X. The main scanning direction X is a direction crossing a sub-scanning direction Y. The sub-scanning direction Y indicates a conveying direction of the printing medium M. The scanning motor 363 causes the carriage 362 to perform scanning in the main scanning direction X. The conveying motor 364 conveys the printing medium M in the conveying direction.

The printing mechanism 360 executes a printing function. In other words, the printing mechanism 360 configures a part of the "printing apparatus".

The printing mechanism 360 is further explained with reference to FIG. 4.

The ink supply unit 370 houses ink tanks for storing inks and supplies the inks from the ink tanks to the printing head 361 of the printing mechanism 360. The inks supplied by the ink supply unit 370 are inks of colors such as cyan (C), magenta (M), yellow (Y), and black (K).

The printing medium storing unit 380 is configured to be capable of storing the printing medium M. When the printing medium M is cut paper, the printing medium storing unit 380 delivers the stored cut paper to a not-shown conveying path with conveyance by the conveying motor 364. The printing medium storing unit 380 may include a component that collects a print, which is the printing medium M after printing. The component that collects the print may be a component on which the cut paper is staked and placed.

Subsequently, functional blocks included in the third control unit 310 of the first multifunction peripheral 300A are explained.

The third control unit 310 includes a deadline accepting unit 311, a display control unit 312, a printing control unit 313, a reading executing unit 314, a transmitting unit 315, a third communication control unit 316, and an operation date and time storage unit 317 as the functional blocks.

The third processor 310A executes the third control program PG3, whereby the third processor 310A functions as the deadline accepting unit 311, the display control unit 312, the printing control unit 313, the reading executing unit 314, the transmitting unit 315, and the third communication control unit 316. The third processor 310A executes the third control program PG3, whereby the third control unit 310 causes the third memory 310B to function as the operation date and time storage unit 317.

The third control unit 310 has a clocking function for measuring a date and time. The third control unit 310 adjusts the date and time of the clocking function by, for example, periodically communicating with the server apparatus 200.

The operation date and time storage unit 317 stores a date and time when reading operation was accepted from the third operation mechanism 330. The reading operation is operation for instructing the scanner mechanism 320 to read an image formed on the printing medium M. The printing medium M includes the second print P2. The image formed on the printing medium M includes an image printed on the printing medium M and an image of characters and the like written on the printing medium M by a user. The reading operation is input from the third operation mechanism 330 by the first user UA. The date and time when the reading operation was accepted from the third operation mechanism 330 is stored in the operation date and time storage unit 317 by the reading executing unit 314.

The deadline accepting unit 311 accepts the second deadline information TEA2 by receiving the second deadline information TEA2 from the server apparatus 200. The second deadline information TEA2 includes at least one of the date and time information of the deadline TL and the period information indicating the period until the deadline TL.

The second deadline information TEA2 is transmitted from the server apparatus 200 at predetermined timing. The predetermined timing includes the first timing T1, the second timing T2, and the third timing T3.

The second deadline information TEA2 transmitted from the server apparatus 200 at the first timing T1 indicates the date and time information of the deadline TL. The second deadline information TEA2 transmitted from the server apparatus 200 at the second timing T2 indicates that the period until the deadline TL is three days. The second deadline information TEA2 transmitted from the server apparatus 200 at the third timing T3 indicates that the period until the deadline TL is one day.

When the deadline accepting unit 311 has accepted the second deadline information TEA2 from the server apparatus 200, the display control unit 312 displays the second deadline information TEA2 on the display panel of the third display mechanism 340.

For example, when the deadline accepting unit 311 has accepted the second deadline information TEA2 indicating the date and time information of the deadline TL, the display control unit 312 displays a date and time of the deadline TL on the display panel. When the deadline accepting unit 311 has accepted the second deadline information TEA2 indicating that the period until the deadline TL is three days, the display control unit 312 displays on the display panel that the period until the deadline TL is three days. When the deadline accepting unit 311 has accepted the second deadline information TEA2 indicating that the period until the deadline TL is one day, the display control unit 312 displays on the display panel that the period until the deadline TL is one day.

When accepting an instruction to print the teaching material contents CT from the server apparatus 200, the printing control unit 313 causes the printing mechanism 360 to print the teaching material contents CT and generates the first print P1. The first print P1 is a print obtained by printing an image indicating the teaching material contents CT on printing paper.

When the deadline accepting unit 311 has accepted the second deadline information TEA2 from the server apparatus 200, the printing control unit 313 causes the printing mechanism 360 to print the second deadline information TEA2.

For example, when the deadline accepting unit 311 has accepted the second deadline information TEA2 indicating the date and time information of the deadline TL, the printing control unit 313 prints the date and time of the deadline TL. When the deadline accepting unit 311 has accepted the second deadline information TEA2 indicating that the period until the deadline TL is three days, the printing control unit 313 prints that the period until the deadline TL is three days. When the deadline accepting unit 311 has accepted the second deadline information TEA2 indicating that the period until the deadline TL is one day, the printing control unit 313 prints that the period until the deadline TL is one day.

When accepting reading operation, which is operation for instructing the scanner mechanism 320 to read an image formed on the printing medium M, from the third operation mechanism 330, the reading executing unit 314 executes the following processing. That is, the reading executing unit 314 causes the operation date and time storage unit 317 to store a date and time when the reading operation was accepted from the third operation mechanism 330.

The reading executing unit 314 causes the scanner mechanism 320 to read the image printed on the printing medium M and generates a read image.

When the read image is an image corresponding to the second print P2, the reading executing unit 314 determines that the read image is the first answer image JPA. The second print P2 is a print obtained by the first user UA writing answers to the teaching material contents CT in the first print P1. The first answer image JPA includes the image indicating the teaching material contents CT and the image corresponding to the answer information JR indicating the answers of the first user UA to the teaching material contents CT.

For example, when the read image includes the image corresponding to the teaching material contents CT, the reading executing unit 314 determines that the read image is the first answer image JPA. The reading executing unit 314 determines, as the first start date and time TSA, a date and time when the reading operation was accepted from the third operation mechanism 330.

The transmitting unit 315 transmits the first start date and time TSA and the first answer image JPA to the server apparatus 200.

The third communication control unit 316 receives the second deadline information TEA2 from the server apparatus 200.

The third communication control unit 316 transmits the first start date and time TSA and the first answer image JPA to the server apparatus 200.

Subsequently, differences of the third control unit 310 of the second multifunction peripheral 300B from the third control unit 310 of the first multifunction peripheral 300A are mainly explained.

The operation date and time storage unit 317 stores a date and time when reading operation was accepted from the third operation mechanism 330. The reading operation is operation for instructing the scanner mechanism 320 to read an image printed on the printing medium M. The reading operation is input from the third operation mechanism 330 by the second user UB.

The deadline accepting unit 311 accepts the second deadline information TEB2 by receiving the second deadline information TEB2 from the server apparatus 200.

When the deadline accepting unit 311 has accepted the second deadline information TEB2 from the server apparatus 200, the display control unit 312 displays the second deadline information TEB2 on the display panel of the third display mechanism 340.

When the deadline accepting unit 311 has accepted the second deadline information TEB2 from the server apparatus 200, the printing control unit 313 causes the printing mechanism 360 to print the second deadline information TEB2.

When the read image is the image corresponding to the second print P2, the reading executing unit 314 determines that the read image is the second answer image JPB. The second print P2 is a print obtained by the second user UB writing answers to the teaching material contents CT in the first print P1. The second answer image JPB includes the image indicating the teaching material contents CT and the image corresponding to the answer information JR indicating the answers of the second user UB to the teaching material contents CT.

For example, when the read image includes the image corresponding to the teaching material contents CT, the reading executing unit 314 determines that the read image is the second answer image JPB. The reading executing unit 314 sets, as the second start date and time TSB, a date and time when the read operation was accepted from the third operation mechanism 330.

The transmitting unit 315 transmits the second start date and time TSB and the second answer image JPB to the server apparatus 200.

The third communication control unit 316 receives the second deadline information TEB2 from the server apparatus 200.

The third communication control unit 316 transmits the second start date and time TSB and the second answer image JPB to the server apparatus 200.

Subsequently, a configuration of the printing mechanism 360 is explained with reference to FIG. 4. FIG. 4 is a perspective view showing an example of the configuration of the printing mechanism 360.

Figure 4:
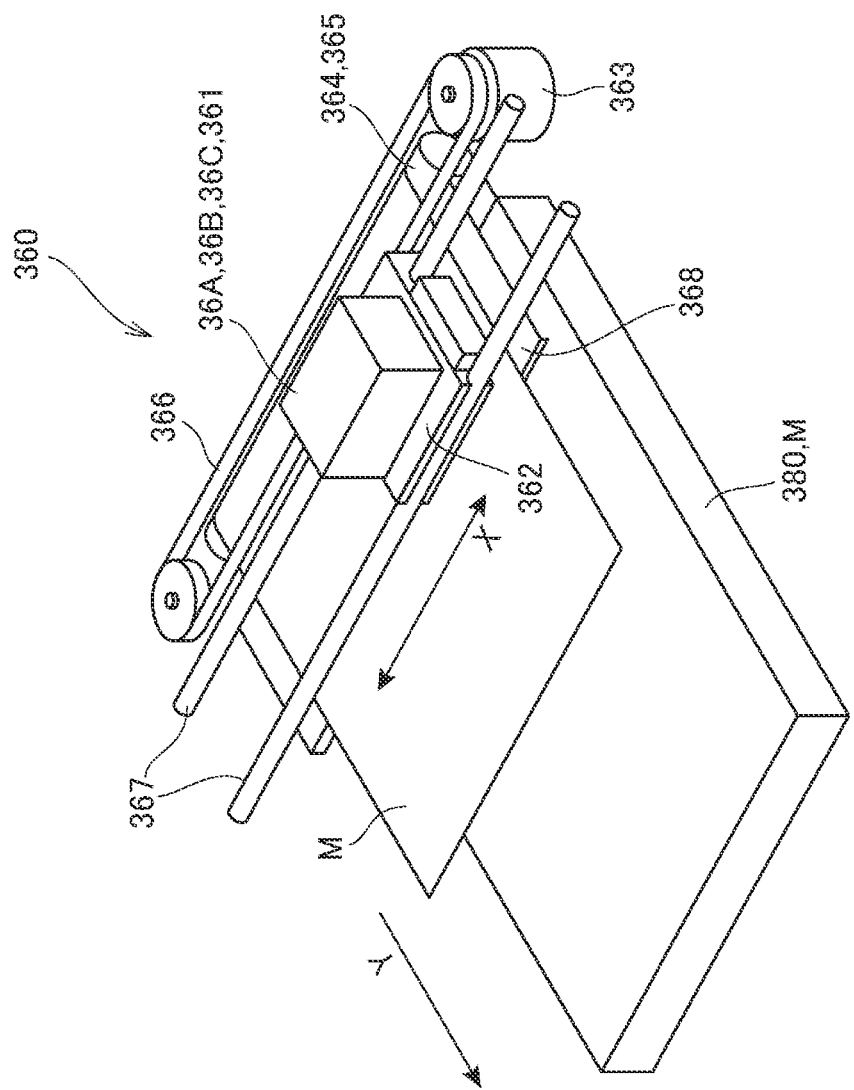
FIG. 4 is a perspective view showing an example of a configuration of a printing mechanism.

As shown in FIG. 4, the printing mechanism 360 includes the carriage 362, the scanning motor 363, a paper feeding roller 365, a traction belt 366, a guide rail 367, a platen 368, and the printing medium storing unit 380.

The paper feeding roller 365 is driven by the conveying motor 364. The traction belt 366 is driven by the scanning motor 363. The guide rail 367 supports the carriage 362 to be movable in the main scanning direction X. The carriage 362 is supported by the guide rail 367 and driven by the scanning motor 363 in the main scanning direction X via the traction belt 366.

A head unit 36A is mounted on the carriage 362.

The head unit 36A includes a plurality of (for example, four) ink cartridges 36B and the printing head 361. The ink cartridges 36B are included in the ink supply unit 370.

The plurality of ink cartridges 36B are detachably attachable to the carriage 362. Inks of different colors are respectively stored in the plurality of ink cartridges 36B. For example, inks of cyan (C), magenta (M), yellow (Y), and black (K) are stored in the ink cartridges 36B. The inks stored in the ink cartridges 36B are supplied to the printing head 361.

The printing head 361 includes nozzles 36C. A plurality of nozzles 36C are disposed in the sub-scanning direction Y on a surface of the printing head 361 opposed to the platen 368. The printing head 361 ejects the inks from the nozzles 36C toward the printing medium M.

The printing medium M is wound on the paper feeding roller 365 from the printing medium storing unit 380 and conveyed in the sub-scanning direction Y along the surface of the platen 368. The carriage 362 is towed by the traction belt 366 driven by the scanning motor 363 and moves in the main scanning direction X along the guide rail 367. The printing head 361 mounted on the carriage 362 also moves in the main scanning direction X.

The main scanning direction X is a direction orthogonal to the sub-scanning direction Y.

Since the printing mechanism 360 has the configuration explained above, the printing mechanism 360 alternately repeats a liquid ejecting operation in which the printing head 361 ejects the inks from the nozzles 36C while moving in the main scanning direction X and a conveying operation for conveying the printing medium M in the sub-scanning direction Y. As a result, the printing mechanism 360 prints images of characters, figures, and the like on the printing medium M.

Figure 5:
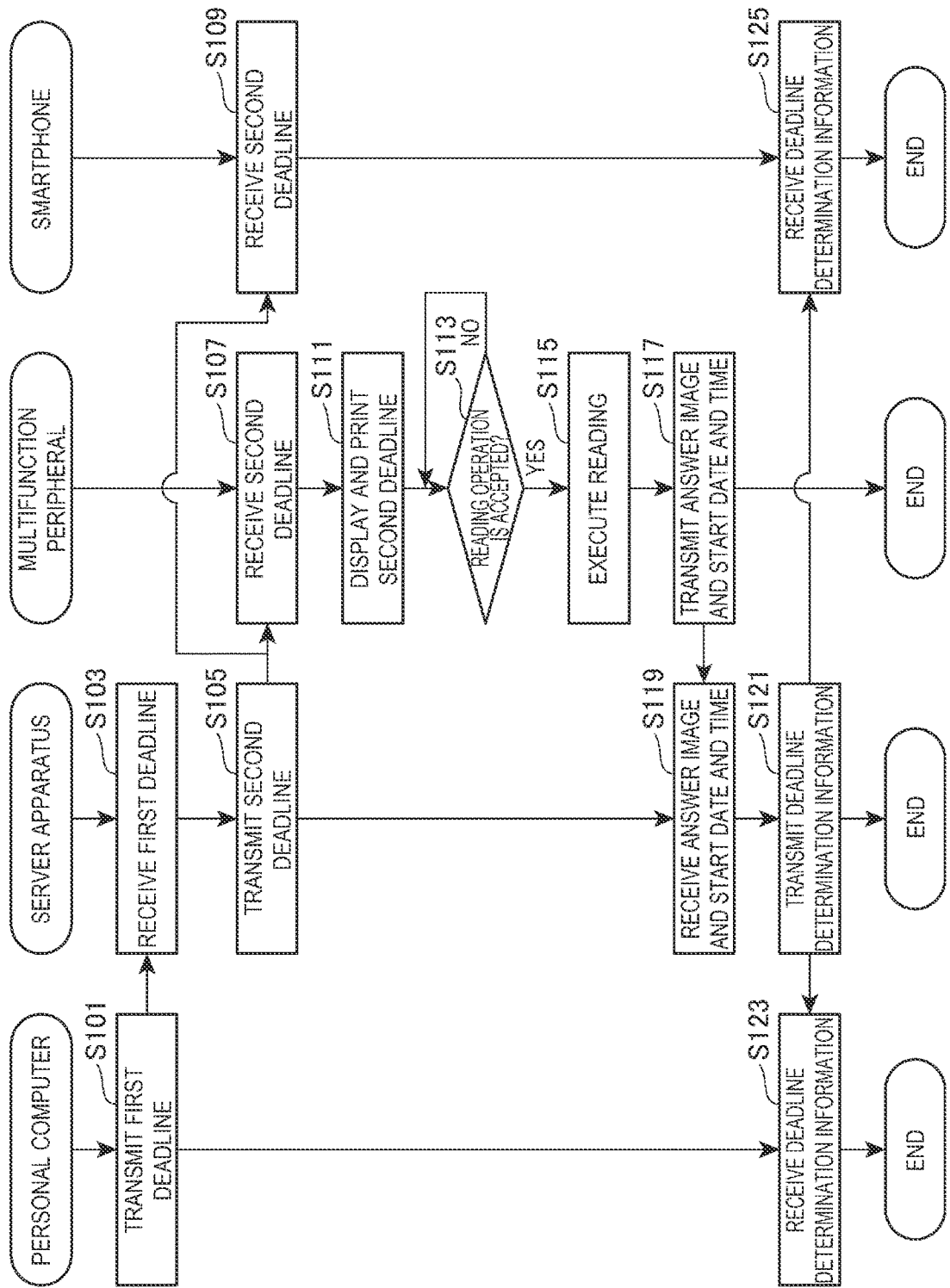
FIG. 5 is a flowchart showing an example of an operation of a deadline management system.

Subsequently, an operation of the deadline management system 1 is explained with reference to FIG. 5. FIG. 5 is a flowchart showing an example of the operation of the deadline management system 1. In FIG. 5, for convenience, the first multifunction peripheral 300A is described as an example of the multifunction peripheral 300 and the first smartphone 400A is described as an example of the smartphone 400. In other words, in FIG. 5, the description of the second multifunction peripheral 300B is omitted and the description of the second smartphone 400B is omitted. In FIG. 5, for convenience, an overview of the operation of the deadline management system 1 is described and details of the operation of the deadline management system 1 are not described.

As shown in FIG. 5, in step S101, the personal computer 100 transmits the first deadline information TEAL to the server apparatus 200. The first deadline information TEAL is a date and time designated by the third user UC as the deadline TL for the first user UA to transmit the answer information JR for the teaching material contents CT from the first multifunction peripheral 300A to the server apparatus 200.

Subsequently, in step S103, the accepting unit 211 of the server apparatus 200 accepts the first deadline information TEAL by receiving the first deadline information TEAL from the personal computer 100.

Subsequently, in step S105, the first notifying unit 212 of the server apparatus 200 notifies, at predetermined timing, the second deadline information TEA2 corresponding to the first deadline information TEAL to the first multifunction peripheral 300A and the first smartphone 400A by transmitting the second deadline information TEA2 to the first multifunction peripheral 300A and the first smartphone 400A.

Subsequently, in step S107, the deadline accepting unit 311 of the first multifunction peripheral 300A accepts the second deadline information TEA2 by receiving the second deadline information TEA2 from the server apparatus 200. The second deadline information TEA2 includes at least one of the date and time information of the deadline TL and the period information indicating the period until the deadline TL.

Subsequently, in step S109, the first smartphone 400A accepts the second deadline information TEA2 by receiving the second deadline information TEA2 from the server apparatus 200.

Subsequently, in step S111, the display control unit 312 of the first multifunction peripheral 300A displays the second deadline information TEA2 on the display panel of the third display mechanism 340. The printing control unit 313 of the first multifunction peripheral 300A causes the printing mechanism 360 to print the second deadline information TEA2.

Subsequently, in step S113, the reading executing unit 314 of the first multifunction peripheral 300A determines whether reading operation for the second print P2 has been accepted from the third operation mechanism 330.

When the reading executing unit 314 determines that the reading operation for the second print P2 has not been accepted from the third operation mechanism 330 (NO in step S113), the processing changes to a standby state. When the reading executing unit 314 determines that the reading operation for the second print P2 has been accepted from the third operation mechanism 330 (YES in step S113), the processing proceeds to step S115.

In step S115, the reading executing unit 314 of the first multifunction peripheral 300A executes a reading operation for an image printed on the second print P2 and generates the first answer image JPA. The first answer image JPA includes the image indicating the teaching material contents CT and the image corresponding to the answer information JR indicating the answers of the first user UA to the teaching material contents CT.

Subsequently, in step S117, the transmitting unit 315 of the first multifunction peripheral 300A transmits the first start date and time TSA and the first answer image JPA to the server apparatus 200. The first start date and time TSA indicates a date and time when the reading operation for the second print P2 was accepted from the third operation mechanism 330.

Subsequently, in step S119, the second notifying unit 213 of the server apparatus 200 receives the first start date and time TSA and the first answer image JPA. The second notifying unit 213 of the server apparatus 200 generates the first deadline determination information JDA based on the first deadline information TEAL and the first start date and time TSA.

Subsequently, in step S121, the second notifying unit 213 of the server apparatus 200 transmits the first deadline determination information JDA to the personal computer 100 and the first smartphone 400A.

Subsequently, in step S123, the personal computer 100 receives the first deadline determination information JDA.

Subsequently, in step S125, the first smartphone 400A receives the first deadline determination information JDA. Thereafter, the processing ends.

Step S103 corresponds to an example of the "accepting step". Step S105 corresponds to an example of the "first notifying step". Step S121 corresponds to an example of the "second notifying step". Step S115 corresponds to an example of the "reading executing step". Step S117 corresponds to an example of the "transmitting step".

As explained above with reference to FIGS. 1 to 5, the deadline management system 1 according to this embodiment is the deadline management system 1 including the personal computer 100, the smartphone 400, the multifunction peripheral 300, and the server apparatus 200 communicably connected to each of the personal computer 100, the smartphone 400, and the multifunction peripheral 300. The server apparatus 200 includes the accepting unit 211 that accepts, from the personal computer 100, the first deadline information TE1 indicating the deadline TL for transmitting the answer information JR for the teaching material contents CT, the first print P1 of which was sent in advance, from the multifunction peripheral 300 to the server apparatus 200, the first notifying unit 212 that notifies the second deadline information TE2 corresponding to the first deadline information TE1 to at least one of the smartphone 400 and the multifunction peripheral 300, and the second notifying unit 213 that notifies, to the personal computer 100, the deadline determination information JD indicating whether the answer image JP including an image corresponding to the answer information JR has been received from the multifunction peripheral 300 by the deadline TL. The multifunction peripheral 300 includes the reading executing unit 314 that reads the second print P2 including the image corresponding to the answer information JR and generates the answer image JP and the transmitting unit 315 that transmits the answer image JP to the server apparatus 200.

With this configuration, the server apparatus 200 accepts, from the personal computer 100, the first deadline information TE1 indicating the deadline TL for transmitting the answer information JR for the teaching material contents CT from the multifunction peripheral 300 to the server apparatus 200. The server apparatus 200 notifies the second deadline information TE2 corresponding to the first deadline information TE1 to at least one of the smartphone 400 and the multifunction peripheral 300. The multifunction peripheral 300 reads the second print P2 including the image corresponding to the answer information JR, generates the answer image JP, and transmits the answer image JP to the server apparatus 200. The server apparatus 200 notifies, to the personal computer 100, the deadline determination information JD indicating whether the answer image JP including the image corresponding to the answer information JR has been received from the multifunction peripheral 300 by the deadline TL.

Accordingly, since the deadline determination information JD indicating whether the answer image JP has been received from the multifunction peripheral 300 by the deadline TL is notified to the personal computer 100, the user of the personal computer 100 can check whether the answer image JP has been received by the deadline TL. Therefore, the user of the personal computer 100, that is, the third user UC can easily manage the deadline TL.

In the deadline management system 1 according to this embodiment, the second deadline information TE2 includes at least one of the date and time information of the deadline TL and the period information indicating the period until the deadline TL.

With this configuration, the second deadline information TE2 includes at least one of the date and time information of the deadline TL and the period information indicating the period until the deadline TL.

The second deadline information TE2 is notified to at least one of the smartphone 400 and the multifunction peripheral 300 by the server apparatus 200. Accordingly, users of the smartphone 400 and the multifunction peripheral 300 can check at least one of the date and time information of the deadline TL and the period information indicating the period until the deadline TL. That is, the first user UA and the second user UB can check at least one of the date and time information of the deadline TL and the period information indicating the period until the deadline TL. Therefore, it is possible to improve the convenience of the first user UA and the second user UB. For example, when the second deadline information TE2 includes the period information indicating the period until the deadline TL, the first user UA and the second user UB can check the period until the deadline TL. As a result, it is possible to improve the convenience of the first user UA and the second user UB.

In the deadline management system 1 according to this embodiment, the first notifying unit 212 notifies the second deadline information TE2 at predetermined timing.

With this configuration, it is possible to improve the convenience of the first user UA and the second user UB by properly setting the predetermined timing. For example, when a period required to generate the answer information JR is, for example, one day, the predetermined timing only has to be set to, for example, one day before the deadline TL. It is possible to improve the convenience of the first user UA and the second user UB by setting the predetermined timing according to the period required to generate the answer information JR as explained above.

In the deadline management system 1 according to this embodiment, when the first notifying unit 212 notifies the second deadline information TE2 to the smartphone 400, the smartphone 400 displays the second deadline information TE2 and, when the first notifying unit 212 notifies the second deadline information TE2 to the multifunction peripheral 300, the multifunction peripheral 300 displays the second deadline information TE2.

With this configuration, since each of the smartphone 400 and the multifunction peripheral 300 displays the second deadline information TE2, the users of the smartphone 400 and the multifunction peripheral 300 can check the second deadline information TE2 corresponding to the first deadline information TE1. That is, the first user UA and the second user UB can check the deadline TL for transmitting the answer information JR from the multifunction peripheral 300 to the server apparatus 200. Therefore, it is possible to improve the convenience of the first user UA and the second user UB.

In the deadline management system 1 according to this embodiment, the transmitting unit 315 transmits the start date and time TS, which is a date and time when the reading executing unit 314 started to read the second print P2, to the server apparatus 200 and the second notifying unit 213 determines, based on the start date and time TS, whether the multifunction peripheral 300 has transmitted the answer image JP by the deadline TL.

With this configuration, since it is determined, based on the start date and time TS, whether the multifunction peripheral 300 has transmitted the answer image JP by the deadline TL, the second notifying unit 213 of the server apparatus 200 can properly determine whether the multifunction peripheral 300 has transmitted the answer image JP by the deadline TL. For example, when the start date and time TS is a date and time until the deadline TL, the second notifying unit 213 only has to determine that the multifunction peripheral 300 has transmitted the answer image JP by the deadline TL. On the other hand, when the start date and time TS is not the date and time until the deadline TL, the second notifying unit 213 only has to determine that the multifunction peripheral 300 has not transmitted the answer image JP by the deadline TL. In this way, the second notifying unit 213 can properly determine whether the multifunction peripheral 300 has transmitted the answer image JP by the deadline TL.

In the deadline management system 1 according to this embodiment, when determining that the multifunction peripheral 300 has not transmitted the answer image JP by the deadline TL, the second notifying unit 213 notifies, to the smartphone 400, the deadline determination information JD indicating that the multifunction peripheral 300 has not transmitted the answer image JP by the deadline TL.

With this configuration, since the deadline determination information JD indicating that the multifunction peripheral 300 has not transmitted the answer image JP by the deadline TL is notified to the smartphone 400, the user can easily confirm that the multifunction peripheral 300 has not transmitted the answer image JP by the deadline TL. That is, the first user UA and the second user UB, who are the users of the smartphone 400, can easily confirm that the multifunction peripheral 300 has not transmitted the answer image JP by the deadline TL. Therefore, it is possible to improve the convenience of the first user UA and the second user UB.

In the deadline management system 1 according to this embodiment, the multifunction peripheral 300 further includes a printing function, the first notifying unit 212 notifies the second deadline information TE2 to the multifunction peripheral 300, and the multifunction peripheral 300 prints the second deadline information TE2.

With this configuration, since the first notifying unit 212 notifies the second deadline information TE2 to the multifunction peripheral 300 and the multifunction peripheral 300 prints the second deadline information TE2, the user of the multifunction peripheral 300 can check the second deadline information TE2 with a print on which the second deadline information TE2 is printed. Therefore, it is possible to improve the convenience of the first user UA and the second user UB, who are the users of the multifunction peripheral 300.

In the deadline management system 1 according to this embodiment, the multifunction peripheral 300 is configured as an apparatus in which the reading apparatus and the printing apparatus are integral.

With this configuration, since the multifunction peripheral 300 is configured as the apparatus in which the reading apparatus and the printing apparatus are integral, the reading apparatus and the printing apparatus can be compactly disposed. Therefore, it is possible to improve the convenience of the user of the multifunction peripheral 300, that is, the first user UA and the second user UB.

A control method for the deadline management system 1 according to this embodiment is a control method for the deadline management system 1 including the personal computer 100, the smartphone 400, the multifunction peripheral 300, and the server apparatus 200 communicably connected to each of the personal computer 100, the smartphone 400, and the multifunction peripheral 300. The server apparatus 200 executes an accepting step for accepting, from the personal computer 100, the first deadline information TE1 indicating the deadline TL for transmitting the answer information JR for the teaching material contents CT, the first print P1 of which was sent in advance, from the multifunction peripheral 300 to the server apparatus 200, a first notifying step for notifying the second deadline information TE2 corresponding to the first deadline information TE1 to at least one of the smartphone 400 and the multifunction peripheral 300, and a second notifying step for notifying, to the personal computer 100, the deadline determination information JD indicating whether the answer image JP including an image corresponding to the answer information JR has been received from the multifunction peripheral 300 by the deadline TL. The multifunction peripheral 300 executes a reading executing step for reading the second print P2 including the image corresponding to the answer information JR and generating the answer image JP and a transmitting step for transmitting the answer image JP to the server apparatus 200.

With this configuration, the same effects as the effects of the deadline management system 1 according to this embodiment are achieved.

The server apparatus 200 according to this embodiment is the server apparatus 200 communicably connected to each of the personal computer 100, the smartphone 400, and the multifunction peripheral 300. The server apparatus 200 includes the accepting unit 211 that accepts, from the personal computer 100, the first deadline information TE1 indicating the deadline TL for transmitting the answer information JR for the teaching material contents CT, the first print P1 of which was sent in advance, from the multifunction peripheral 300 to the server apparatus 200, the first notifying unit 212 that notifies the second deadline information TE2 corresponding to the first deadline information TE1 to at least one of the smartphone 400 and the multifunction peripheral 300, and the second notifying unit 213 that notifies, to the personal computer 100, the deadline determination information JD indicating whether the answer image JP including an image corresponding to the answer information JR has been received from the multifunction peripheral 300 by the deadline TL.

With this configuration, the same effects as the effects of the deadline management system 1 according to this embodiment are achieved.

This embodiment indicates an aspect and can be optionally modified and applied without departing from the gist of the present disclosure.

In this embodiment, the "information processing apparatus" is configured by the server apparatus 200. However, not only this, but, for example, the "information processing apparatus" may be configured by a personal computer or may be configured by a tablet terminal.

In this embodiment, the "reading apparatus" is the multifunction peripheral 300 of the ink-jet type. However, not only this, but the "reading apparatus" may be a so-called scanner apparatus.

In this embodiment, the "printing apparatus" is configured as an apparatus integral with the "reading apparatus", that is, the multifunction peripheral 300. However, not only this, but the "printing apparatus" may be configured as an apparatus separate from the "reading apparatus". For example, the "printing apparatus" may be a so-called printer.

In this embodiment, the multifunction peripheral 300 includes the two multifunction peripherals, that is, the first multifunction peripheral 300A and the second multifunction peripheral 300B. However, not only this, but the multifunction peripheral 300 may be configured by one or more multifunction peripherals or may be configured by three or more multifunction peripherals.

In this embodiment, the "first terminal apparatus" is configured by the personal computer 100. However, not only this, but, for example, the "first terminal apparatus" may be configured by a tablet terminal or may be configured by a smartphone.

In this embodiment, the "second terminal apparatus" is configured by the smartphone 400. However, not only this, but, for example, the "second terminal apparatus" may be configured by a personal computer or may be configured by a table terminal.

In this embodiment, the smartphone 400 is configured by the two smartphones, that is, the first smartphone 400A and the second smartphone 400B. However, not only this, but the smartphone 400 may be configured by one smartphone or may include three or more smartphones.

In this embodiment, the first notifying unit 212 of the server apparatus 200 notifies the second deadline information TE2 to the smartphone 400 and the multifunction peripheral 300. However, not only this, but the first notifying unit 212 of the server apparatus 200 only has to notify the second deadline information TE2 to at least one of the smartphone 400 and the multifunction peripheral 300.

In this embodiment, when the answer image JP has not been received from the multifunction peripheral 300 by the deadline TL, the second notifying unit 213 of the server apparatus 200 notifies the deadline determination information JD to the smartphone 400. However, not only this, but, when the answer image JP has been received from the multifunction peripheral 300 by the deadline TL, the second notifying unit 213 of the server apparatus 200 may also notify the deadline determination information JD to the smartphone 400.

In this embodiment, the control method realized by the second processor 210A included in the server apparatus 200 executing the second control program PG2 is explained. However, the control method can also be configured in a form of a recording medium in which the second control program PG2 to be executed by the second processor 210A in order to realize the control method is computer-readably recorded or a transmission medium for transmitting the second control program PG2.

As the recording medium, a magnetic or optical recording medium or a semiconductor memory device can be used. Examples of the recording medium include portable and stationary recording media such as a flexible disk, a HDD, a CR-ROM (Compact Disk Read Only Memory), a DVD (Digital Versatile Disk), a Blu-ray (registered trademark) Disc, a magneto-optical disk, a flash memory, and a card-type recording medium.

The recording medium may be a volatile or nonvolatile storage device such as a RAM, a ROM, or a HDD, which is an internal storage device included in the server apparatus 200.

The function of the second control unit 210 of the server apparatus 200 may be realized by one or a plurality of processors or a semiconductor chip. The second control unit 210 may further include a co-processor such as an SoC (System-on-a-Chip), an MCU (Micro Control Unit), or an FPGA. The second control unit 210 may perform various kinds of control by causing both of the CPU and the co-processor to cooperate or selectively using one of the CPU and the co-processor.

In this embodiment, the control method realized by the third processor 310A included in the multifunction peripheral 300 executing the third control program PG3 is explained. However, the control method can also be configured in a form of a recording medium in which the third control program PG3 to be executed by the third processor 310A in order to realize the control method is computer-readably recorded or a transmission medium for transmitting the third control program PG3.

As the recording medium, a magnetic or optical recording medium or a semiconductor memory device can be used. Examples of the recording medium include portable and stationary recording media such as a flexible disk, a HDD, a CR-ROM, a DVD, a Blu-ray (registered trademark) Disc, a magneto-optical disk, a flash memory, and a card-type recording medium.

The recording medium may be a volatile or nonvolatile storage device such as a RAM, a ROM, or a HDD, which is an internal storage device included in the multifunction peripheral 300.

The function of the third control unit 310 of the multifunction peripheral 300 may be realized by one or a plurality of processors or a semiconductor chip. The third control unit 310 may further include a co-processor such as an SoC, an MCU, or an FPGA. The third control unit 310 may perform various kinds of control by causing both of the CPU and the co-processor to cooperate or selectively using one of the CPU and the co-processor.

Processing units of the flowchart of FIG. 5 are divided according to main processing contents in order to facilitate understanding of the processing of the second control unit 210 of the server apparatus 200 and the third control unit 310 of the multifunction peripheral 300 and are not limited by a way of the division and names of the processing units. The processing units of the flowchart may be divided into a larger number of processing units according to processing contents. The processing units may be divided such that one processing unit includes a larger number of kinds of processing. The order of the processing may be changed as appropriate in a range in which the gist of the present disclosure is not hindered.

The functional units shown in FIGS. 2 and 3 indicate functional components and specific implementation forms of the functional units are not particularly limited. Hardware individually corresponding to the functional units does not always need to be implemented. Functions of a plurality of functional units can also be realized by one processor executing a program. A part of functions realized by software in the embodiment explained above may be realized by hardware or a part of functions realized by hardware in the embodiment may be realized by software. Besides, specific detailed configurations of the other units of the server apparatus 200 and the multifunction peripheral 300 can also be optionally changed without departing from the gist of the present disclosure.

What is claimed is:

1. A deadline management system comprising a first terminal apparatus, a second terminal apparatus, a reading apparatus, and an information processing apparatus communicably connected to each of the first terminal apparatus, the second terminal apparatus, and the reading apparatus, wherein
the information processing apparatus in includes:
a first processor; and
a first memory including instructions stored thereon that, when executed by the first processor, cause the information processing apparatus to function as:
an accepting unit configured to accept, from the first terminal apparatus, first deadline information indicating a deadline for transmitting answer information for contents, a first print of which was sent in advance, from the reading apparatus to the information processing apparatus;
a first notifying unit configured to notify second deadline information corresponding to the first deadline information to at least one of the second terminal apparatus and the reading apparatus; and
a second notifying unit configured to notify, to the first terminal apparatus, deadline determination information indicating whether an answer image including an image corresponding to the answer information was received from the reading apparatus by the deadline, and
the reading apparatus includes:
a second processor; and
a second memory including instructions stored thereon that, when executed by the second processor, cause the reading apparatus to function as:
a reading executing unit configured to read a second print including the image corresponding to the answer information and generate the answer image; and
a transmitting unit configured to transmit the answer image to the information processing apparatus.

2. The deadline management system according to claim 1, wherein the second deadline information includes at least one of date and time information of the deadline and period information indicating a period until the deadline.

3. The deadline management system according to claim 1, wherein the first notifying unit notifies the second deadline information at predetermined timing.

4. The deadline management system according to claim 1, wherein
when the first notifying unit notified the second deadline information to the second terminal apparatus, the second terminal apparatus displays the second deadline information, and
when the first notifying unit notified the second deadline information to the reading apparatus, the reading apparatus displays the second deadline information.

5. The deadline management system according to claim 1, wherein
the transmitting unit transmits a start date and time, which is a date and time when the reading executing unit started to read the second print, to the information processing apparatus, and
the second notifying unit determines, based on the start date and time, whether the reading apparatus transmitted the answer image by the deadline.

6. The deadline management system according to claim 1, wherein, when it is determined that the reading apparatus did not transmit the answer image by the deadline, the second notifying unit notifies, to the second terminal apparatus, the deadline determination information indicating that the reading apparatus did not transmit the answer image by the deadline.

7. The deadline management system according to claim 1, further comprising a printing apparatus communicably connected to the information processing apparatus, wherein
the first notifying unit notifies the second deadline information to the printing apparatus, and
the printing apparatus prints the second deadline information.

8. The deadline management system according to claim 7, wherein the printing apparatus is configured as an apparatus integral with the reading apparatus.

9. A control method for a deadline management system including a first terminal apparatus, a second terminal apparatus, a reading apparatus, and an information processing apparatus communicably connected to each of the first terminal apparatus, the second terminal apparatus, and the reading apparatus, e control method comprising:

by the information processing apparatus, which includes a first processor and a first memory including instructions stored thereon;

accepting, from the first terminal apparatus, first deadline information indicating a deadline for transmitting answer information for contents, a first print of which was sent in advance, from the reading apparatus to the information processing apparatus;

notifying second deadline information corresponding to the first deadline information to at least one of the second terminal apparatus and the reading apparatus; and notifying, to the first terminal apparatus, deadline determination information indicating whether an answer image including an image corresponding to the answer information was received from the reading apparatus by the deadline, and by the reading apparatus, which includes a second processor and a second memory including instructions stored thereon;

reading a second print including the image corresponding to the answer information and generating the answer image; and transmitting the answer image to the information processing apparatus.

10. An information processing apparatus communicably connected to each of a first terminal apparatus, a second terminal apparatus, and a reading apparatus, the information processing apparatus comprising:

a processor; and a memory including instructions stored thereon that, when executed by the processor, cause the information processing apparatus to function as:

an accepting unit configured to accept, from the first terminal apparatus, first deadline information indicating a deadline for transmitting answer information for contents, a first print of which was sent in advance, from the reading apparatus to the information processing apparatus;

a first notifying unit configured to notify second deadline information corresponding to the first deadline information to at least one of the second terminal apparatus and the reading apparatus; and a second notifying unit configured to notify, to the first terminal apparatus, deadline determination information indicating whether an answer image including an image corresponding to the answer information was received from the reading apparatus by the deadline.

\* \* \* \* \*